Jan. 31, 1956     C. R. DEAKIN     2,732,916
LUBRICATING MEANS
Filed Aug. 20, 1953
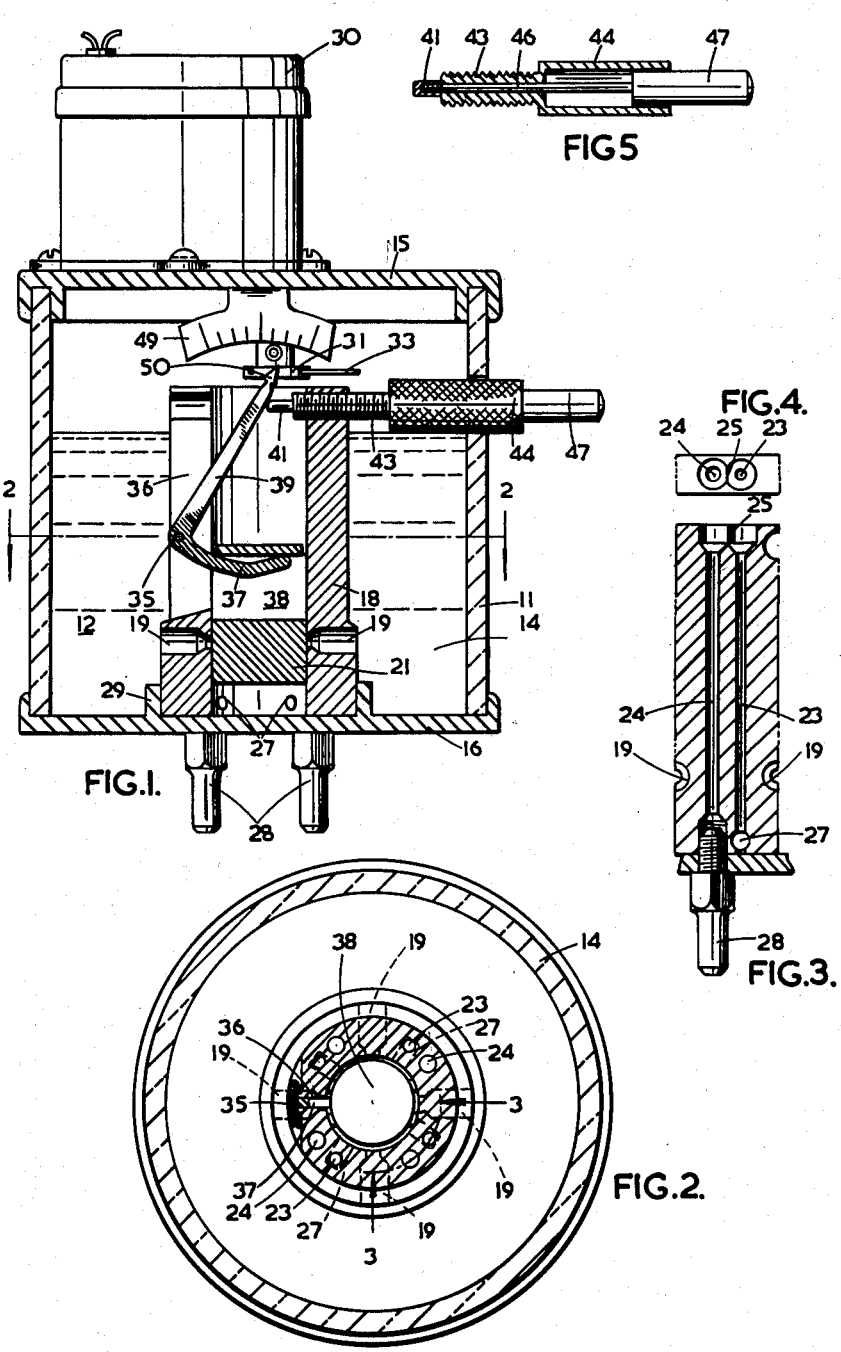

United States Patent Office

2,732,916
Patented Jan. 31, 1956

2,732,916

LUBRICATING MEANS

Cyril Reginald Deakin, Leicester, England

Application August 20, 1953, Serial No. 375,468

Claims priority, application Great Britain
September 27, 1952

3 Claims. (Cl. 184—14)

This invention relates to a lubricating means of the kind which is required to deliver a small, predetermined quantity of lubricant at successive predetermined periods.

This requirement is met with, for example, in the case of knitting machines, where it is essential that certain of the moving parts should be periodically lubricated, and important that no excess of lubricant should be supplied, or that the lubricant should not be delivered just before the machine is shutting down for a period, as in either of these cases there is a tendency for the lubricant to leak on to and disfigure the work being knitted.

The main object of the invention is to provide a lubricating means by which this may be achieved in a very simple and exact manner.

The lubricating means of the invention includes a plunger, in a cylinder, which can be raised by a lever against a bias, and a clockwork mechanism driving a slowly-rotating disc or the like adapted selectively to carry one or more projections which act on the lever and, on passing the latter, allow the plunger to move downwardly to effect a delivery of lubricant from beneath.

Although particularly designed for a knitting machine, the invention is by no means restricted in this respect.

In the accompanying drawings:

Figure 1 is a sectional elevation of one form of lubricating means according to the invention;

Figure 2 is a cross-section taken on the line 2—2 of Figure 1;

Figure 3 is a fragmentary sectional elevation taken on the line 3—3 of Figure 2;

Figure 4 is a plan view of Figure 3; and

Figure 5 is a fragmentary section of parts hereinafter described.

In the construction shown, the lubricating means includes a closed container 11 for the lubricant 12 having a filtering inlet opening (not shown) in its upper end, the container conveniently consisting of a transparent cylinder 14 joined to top and bottom plates 15, 16. The bottom plate 16 supports in the interior of the container 11 a generally vertical cylinder 18 which may be coaxial with the container. Near the lower end of the cylinder 18 is an inlet hole through its wall, or two or more inlet holes 19 in the same plane, by which the lower end of the cylinder is placed in communication with the lubricant 12 in the container; but normally the inlet hole (or holes) is closed by the lower end of a plunger 21 within the cylinder. This plunger is downwardly biased, as by gravity.

In addition, there is at least one metering transfer passage connecting with the interior of the cylinder below the inlet holes 19. In practice, there may be such a transfer passage for each point or group of points to be lubricated, the metering being effected by an appropriate constriction in the passage. In the construction shown, where there are four transfer passages drilled longitudinally in the wall of the cylinder 18, each transfer passage comprising two parallel and adjacent drillings 23, 24 which communicate with one another at 25 below the upper end of the cylinder, the lower ends of one (23) of each pair of drillings communicating with the interior of the cylinder at 27, and the lower end of the other drilling 24 being connected to an outlet 28 for connection to a point to be lubricated. In this arrangement the aforesaid constriction for each transfer passage is provided by the length of the pair of the adjacent narrow drillings 23, 24, and also by the inlet 27. Alternatively, however, the metering constriction may be provided by the outlet 28 itself.

The lower plate 16 has a locating flange 29 in which the cylinder 18 is sealed. Thus, the passages 27 can be drilled right through the wall of the cylinder 18, their outer ends being sealed by the flange 29.

Mounted upon the upper end plate 15 is a casing 30 of a clockwork mechanism, preferably one which is electrically driven; and the clockwork mechanism incorporates a driven disc or the like 31 which is disposed beneath the upper end plate, within the container, partly to one side of the cylinder, and which is driven through reduction gearing so as to make, say, one complete revolution every twelve hours.

To indicate that the clockwork mechanism is working, use may be made of a pointer driven from another part of the gearing and arranged to revolve, say, at one revolution each minute, in a well-known manner.

This slowly-rotating disc or the like is adapted selectively to carry one or more projections which are attached to it dependently upon the periods between which lubricant is to be delivered. For this purpose the disc may have radial holes adapted to receive radial projections such as that marked 33. If there are six such equally-spaced projections, then a lubricating impulse will be applied (in the manner mentioned below) every two hours. If there is only a pair of diametrically opposite projections, then there will only be a lubricating impulse every six hours. Obviously, other arrangements are possible.

Pivotally mounted at 35 in an upper slot 36 in the cylinder wall is a bell crank lever with a lower almost horizontal arm 37 which engages in a deep recess 38 of the plunger 21, and with an upper vertical arm 39 which is positioned so as to be engaged and rocked by any one of the said projections 33 during the rotation of the disc or the like 31, so as to raise the plunger slowly until the projection slips past the upper arm 39 of the lever, whereupon the plunger can fall to give a lubricating impulse. (When raised the plunger uncovers the inlet hole or holes 19.)

The extent to which the plunger can fall in this way, i. e., the extent of the lubricating impulse, is controlled by an adjustable abutment 41 regulating the return of the upper arm 39 of the lever. This abutment 41 is shown as being carried by a hollow screw 43 having a threaded engagement with the wall of the upper end of the cylinder, the screw having a hand adjustable portion 44 which extends through an opening provided for the purpose in the wall of the container, to allow of manual setting. The abutment 41 is secured, as by a screwthread, to the end of a rod 46, slidably engaged in a bore in the screw 43, the other end of the rod carrying an enlargement 47 extending from the interior of the portion 44, and the enlargement can be depressed, when desired, to provide manually controlled lubrication, as when starting up.

It will be evident that, during the fall of the plunger, lubricant beneath the plunger will be expressed into the transfer passage or passages and the total amount of lubricant thus expressed will be dependent upon the setting of the adjustable abutment for the lever. The total quantity of lubricant (for example, one drop or four drops) delivered to any of the outlet drillings at each predetermined period will be dependent upon the constriction in the transfer passage.

The drawings also show a scale 49 with which coacts the upper end 50 of the arm 39 to indicate the setting of the abutment 41—i. e., the total quantity of lubricant to be delivered during each lubrication impulse.

What I claim as my invention and desire to secure by Letters Patent of the United States is:

1. A lubricating means which is required to deliver a small, predetermined quantity of lubricant at successive predetermined periods, including a cylinder with a gravity-biased plunger therein, a lever adapted to raise said plunger against its bias, said cylinder having a port for lubricant through its wall which is uncovered when said plunger is raised, and a clockwork mechanism driving a slowly-rotating member, said member adapted to selectively carry angularly-spaced projections which act on the lever and, on passing the latter, allow the plunger to move downwardly to effect a delivery of lubricant from beneath, and comprising, in the cylinder wall, a metering transfer passage consisting of two parallel and adjacent drillings in the cylinder wall which communicate with one another below the upper end of the cylinder, the lower end of one of the drillings communicating with the interior of said cylinder below said plunger, and the lower end of the other drilling forming an outlet for connection to a point to be lubricated.

2. A lubricating means which is required to deliver a small, predetermined quantity of lubricant at successive predetermined periods, including a cylinder with a gravity-biased plunger therein, a lever adapted to raise said plunger against its bias, said cylinder having a port for lubricant through its wall which is uncovered when said plunger is raised, and a clockwork mechanism driving a slowly-rotating member, said member adapted to selectively carry angularly-spaced projections which act on the lever and, on passing the latter, allow the plunger to move downwardly to effect a delivery of lubricant from beneath, and comprising, in the cylinder wall, a metering transfer passage consisting of two parallel and adjacent drillings in the cylinder wall which communicate with one another below the upper end of the cylinder, the lower end of one of the drillings communicating with the interior of said cylinder below said plunger, and the lower end of the other drilling forming an outlet for connection to a point to be lubricated, the lubricating means including a closed container for the lubricant consisting of a transparent hollow body joined to top and bottom plates, said bottom plate supporting in the interior of the container said cylinder and having a circular flange providing location for the lower end of said cylinder.

3. A lubricating means which is required to deliver a small, predetermined quantity of lubricant at successive predetermined periods, including a cylinder with a gravity-biased plunger therein, a lever adapted to raise said plunger against its bias, said cylinder having a port for lubricant through its wall which is uncovered when said plunger is raised, and a clockwork mechanism driving a slowly-rotating member, said member adapted to selectively carry angularly-spaced projections which act on the lever and, on passing the latter, allow the plunger to move downwardly to effect a delivery of lubricant from beneath, and comprising, in the cylinder wall, a metering transfer passage consisting of two parallel and adjacent drillings in the cylinder wall which communicate with one another below the upper end of the cylinder, the lower end of one of the drillings communicating with the interior of said cylinder below said plunger, and the lower end of the other drilling forming an outlet for connection to a point to be lubricated, the extent of each lubricating impulse being controlled by an adjustable abutment regulating the return of said lever.

References Cited in the file of this patent

UNITED STATES PATENTS

| | | |
|---|---|---|
| 1,781,948 | Davis | Nov. 18, 1930 |
| 1,937,019 | Hamill | Nov. 28, 1933 |
| 2,403,058 | Davis | July 2, 1946 |